(12) United States Patent
Davis et al.

(10) Patent No.: US 7,610,449 B2
(45) Date of Patent: Oct. 27, 2009

(54) APPARATUS AND METHOD FOR SAVING POWER IN A TRACE CACHE

(75) Inventors: Gordon T. Davis, Chapel Hill, NC (US); Richard W. Doing, Raleigh, NC (US); John D. Jabusch, Cary, NC (US); M V V Anil Krishna, Cary, NC (US); Brett Olsson, Cry, NC (US); Eric F. Robinson, Raleigh, NC (US); Sumedh W. Sathaye, Cary, NC (US); Jeffrey R. Summers, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/538,458

(22) Filed: Oct. 4, 2006

(65) Prior Publication Data

US 2008/0086595 A1   Apr. 10, 2008

(51) Int. Cl.
   *G06F 12/00* (2006.01)
(52) U.S. Cl. .................. 711/122; 711/125; 712/237
(58) Field of Classification Search ............... 711/122, 711/125; 712/237
   See application file for complete search history.

(56) References Cited

U.S. PATENT DOCUMENTS

| | | | |
|---|---|---|---|
| 5,634,034 A * | 5/1997 | Foster | 711/147 |
| 6,014,742 A | 1/2000 | Krick | |
| 6,018,786 A | 1/2000 | Krick | |
| 6,073,213 A | 6/2000 | Peled | |
| 6,076,144 A | 6/2000 | Peled | |
| 6,105,032 A | 8/2000 | Bunda | |
| 6,145,123 A | 11/2000 | Torrey | |
| 6,167,536 A | 12/2000 | Mann | |
| 6,170,038 B1 | 1/2001 | Krick | |
| 6,185,675 B1 * | 2/2001 | Kranich et al. | 712/238 |
| 6,185,732 B1 | 2/2001 | Mann | |
| 6,223,228 B1 | 4/2001 | Ryan | |
| 6,223,338 B1 | 4/2001 | Smolders | |
| 6,223,339 B1 | 4/2001 | Shah | |
| 6,256,727 B1 | 7/2001 | McDonald | |
| 6,327,699 B1 | 12/2001 | Larus | |
| 6,332,189 B1 | 12/2001 | Baweja | |
| 6,339,822 B1 | 1/2002 | Miller | |
| 6,418,530 B2 | 7/2002 | Hsu | |
| 6,442,674 B1 | 8/2002 | Lee | |
| 6,449,714 B1 | 9/2002 | Sinharoy | |
| 6,453,411 B1 | 9/2002 | Hsu | |
| 6,457,119 B1 | 9/2002 | Boggs | |
| 6,549,987 B1 | 4/2003 | Rappoport | |
| 6,578,138 B1 | 6/2003 | Kyker | |
| 6,598,122 B2 | 7/2003 | Mukherjee | |
| 6,631,445 B2 | 10/2003 | Rappoport | |
| 6,647,491 B2 | 11/2003 | Hsu | |

(Continued)

*Primary Examiner*—Brian R Peugh
*Assistant Examiner*—Hashem Farrokh
(74) *Attorney, Agent, or Firm*—Joscelyn G. Cockburn; Mark E. McBurney; Daniel E. McConnell

(57) ABSTRACT

A single unified level one instruction cache in which some lines may contain traces and other lines in the same congruence class may contain blocks of instructions consistent with conventional cache lines. Power is conserved by guiding access to lines stored in the cache and lowering cache clock speed relative to the central processor clock speed.

12 Claims, 3 Drawing Sheets

U.S. PATENT DOCUMENTS

| | | |
|---|---|---|
| 6,792,525 B2 | 9/2004 | Mukherjee |
| 6,807,522 B1 | 10/2004 | Orfali |
| 6,823,473 B2 | 11/2004 | Mukherjee |
| 6,854,051 B2 | 2/2005 | Mukherjee |
| 6,854,075 B2 | 2/2005 | Mukherjee |
| 6,877,089 B2 | 4/2005 | Sinharoy |
| 6,950,903 B2 | 9/2005 | Solomon |
| 6,950,924 B2 | 9/2005 | Miller |
| 6,964,043 B2 | 11/2005 | Wu |
| 7,130,966 B2 * | 10/2006 | Solomon et al. ............ 711/125 |
| 2002/0194464 A1 * | 12/2002 | Henry et al. ................ 712/239 |
| 2003/0005230 A1 * | 1/2003 | Solomon et al. ............ 711/128 |
| 2003/0033483 A1 * | 2/2003 | O'Connor .................... 711/122 |
| 2005/0149769 A1 * | 7/2005 | O'Connor et al. ........... 713/300 |
| 2005/0193175 A1 * | 9/2005 | Morrow ...................... 711/125 |

* cited by examiner

APPARATUS AND METHOD FOR SAVING POWER IN A TRACE CACHE

FIELD AND BACKGROUND OF INVENTION

Traditional processor designs make use of various cache structures to store local copies of instructions and data in order to avoid lengthy access times of typical DRAM memory. In a typical cache hierarchy, caches closer to the processor (L1) tend to be smaller and very fast, while caches closer to the DRAM (L2 or L3) tend to be significantly larger but also slower (longer access time). The larger caches tend to handle both instructions and data, while quite often a processor system will include separate data cache and instruction cache at the L1 level (i.e. closest to the processor core).

All of these caches typically have similar organization, with the main difference being in specific dimensions (e.g. cache line size, number of ways per congruence class, number of congruence classes). In the case of an L1 Instruction cache, the cache is accessed either when code execution reaches the end of the previously fetched cache line or when a taken (or at least predicted taken) branch is encountered within the previously fetched cache line. In either case, a next instruction address is presented to the cache. In typical operation, a congruence class is selected via an abbreviated address (ignoring high-order bits), and a specific way within the congruence class is selected by matching the address to the contents of an address field within the tag of each way within the congruence class.

Addresses used for indexing and for matching tags can use either effective or real addresses depending on system issues beyond the scope of this disclosure. Typically, low order address bits (e.g. selecting specific byte or word within a cache line) are ignored for both indexing into the tag array and for comparing tag contents. This is because for conventional caches, all such bytes/words will be stored in the same cache line.

Recently, Instruction Caches that store traces of instruction execution have been used, most notably with the Intel Pentium 4. These "Trace Caches" typically combine blocks of instructions from different address regions (i.e. that would have required multiple conventional cache lines). The objective of a trace cache is to handle branching more efficiently, at least when the branching is well predicted. The instruction at a branch target address is simply the next instruction in the trace line, allowing the processor to execute code with high branch density just as efficiently as it executes long blocks of code without branches. Just as parts of several conventional cache lines may make up a single trace line, several trace lines may contain parts of the same conventional cache line. Because of this, the tags must be handled differently in a trace cache. In a conventional cache, low-order address lines are ignored, but for a trace line, the full address must be used in the tag.

A related difference is in handling the index into the cache line. For conventional cache lines, the least significant bits are ignored in selecting a cache line (both index & tag compare), but in the case of a branch into a new cache line, those least significant bits are used to determine an offset from the beginning of the cache line for fetching the first instruction at the branch target. In contrast, the address of the branch target will be the first instruction in a trace line. Thus no offset is needed. Flow-through from the end of the previous cache line via sequential instruction execution simply uses an offset of zero since it will execute the first instruction in the next cache line (independent of whether it is a trace line or not). The full tag compare will select the appropriate line from the congruence class. In the case where the desired branch target address is within a trace line but not the first instruction in the trace line, the trace cache will declare a miss, and potentially construct a new trace line starting at that branch target.

SUMMARY OF THE INVENTION

The present invention achieves power savings by accessing only instructions that are valid within a trace cache array. Trace cache lines are variable in size (determined by trace generation rules) and the size of each trace line is stored in the Trace Cache directory. Upon accessing the directory and determining a cache hit, the array(s) are only enabled up to the size of the trace line. Power is saved by not accessing a portion of the trace cache.

More particularly, this invention also saves power by clock gating (not enabling) latches in instruction decode and routing for those instructions that are not in a trace. This is also determined by the trace cache size and is further propagated into the decode/execution pipeline as valid bits that continue the clock gating downstream.

Power is also saved by running the Instruction Trace Unit at half the frequency of the rest of the processor core. Since the trace cache provides a large number of instructions per access (up to 24), the trace unit can run slower and still maintain a constant stream of instructions to the execution units. Branch prediction can also consume a considerable amount of power. The branch prediction logic is before the cache and incorporates the prediction information into the traces. Branch predict power is only consumed during trace formation and not during normal operation when trace cache hits are occurring.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The term "programmed method", as used herein, is defined to mean one or more process steps that are presently performed; or, alternatively, one or more process steps that are enabled to be performed at a future point in time. The term programmed method contemplates three alternative forms. First, a programmed method comprises presently performed process steps. Second, a programmed method comprises a computer-readable medium embodying computer instructions which, when executed by a computer system, perform one or more process steps. Third, a programmed method comprises a computer system that has been programmed by software, hardware, firmware, or any combination thereof to perform one or more process steps. It is to be understood that the term programmed method is not to be construed as simultaneously having more than one alternative form, but rather is to be construed in the truest sense of an alternative form wherein, at any given point in time, only one of the plurality of alternative forms is present.

Fetching instructions in a Trace Cache Design requires accessing a Trace Cache Directory to determine if the desired instructions are in the cache. If the instructions are present, they are accessed from the Trace Cache and moved into the instruction buffers and then to the instruction processing pipeline. The number of instructions read from the Trace Cache can be variable depending on how many instructions can be consumed by the pipeline and how many instructions are valid within the trace. Traces are generated by following numerous rules that result in trace sizes that vary from small to large.

Figure 1:
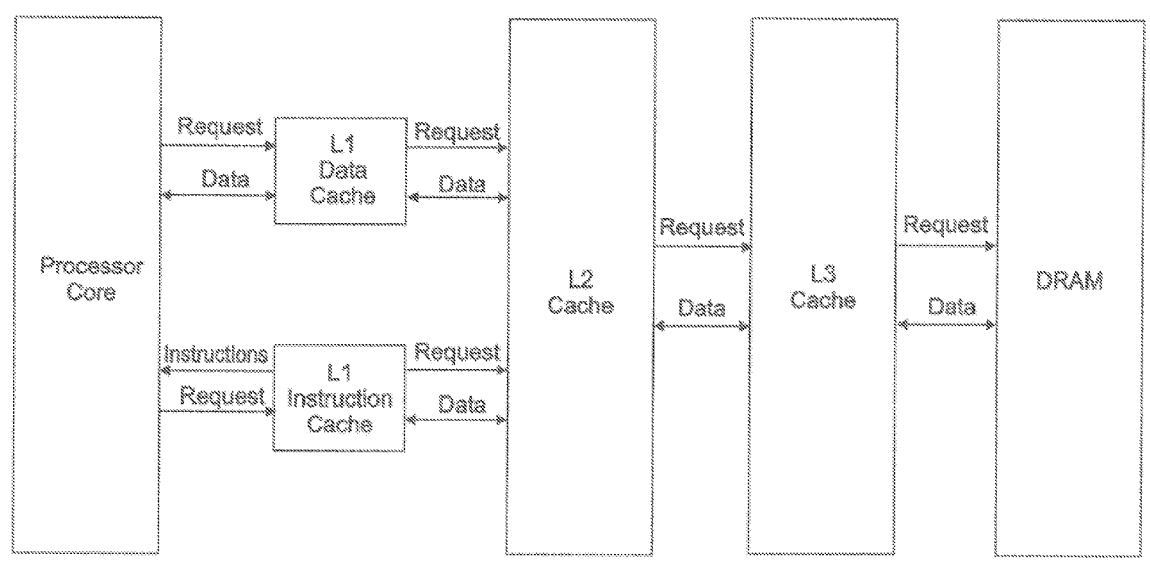
FIG. 1 is a schematic representation of the operative coupling of a computer system central processor and layered memory which has level 1, level 2 and level 3 caches and DRAM.
Figure 2:
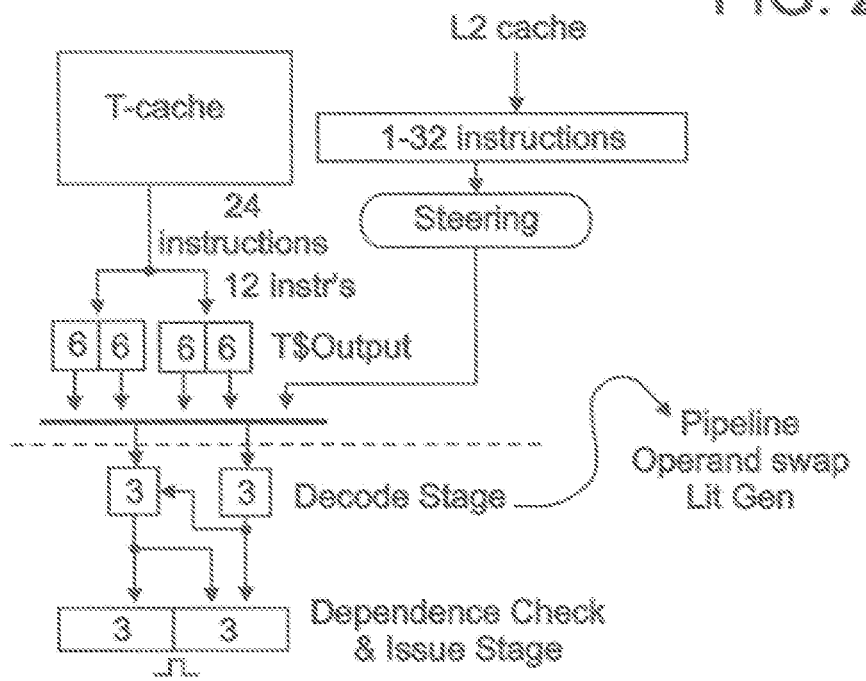
FIG. 2 is schematic representation of certain instruction retrieval interactions among elements of apparatus embodying this invention.
Figure 3:
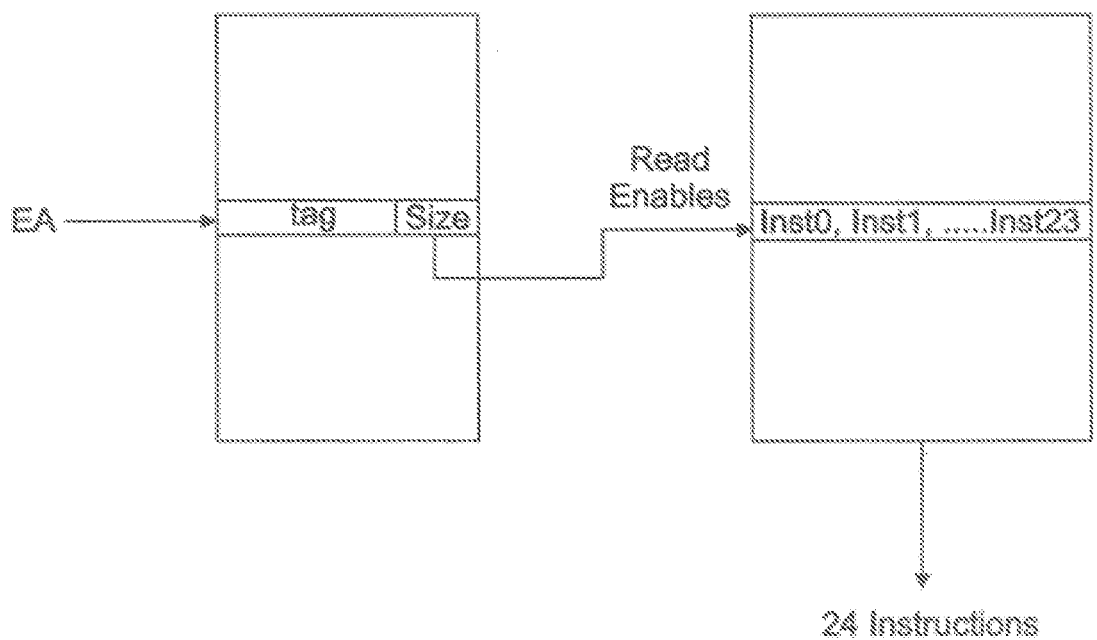
FIG. 3 is a representation of the data held in a cache in accordance with this invention.

In an implementation of this invention shown in FIG. 2, the trace size is a maximum of 24 instructions. Therefore, when a trace cache (T-cache) hit is detected the data read out of the array can be any size from 1 instruction up to 24. The data is always left justified and therefore the end of the trace can be easily determined if the size of the trace is known. FIG. 3 shows a typical cache structure of a directory and data arrays. In this implementation, the trace size is stored within the directory. When a cache hit is detected, the trace size is used to save power by reading only the data associated with valid instruction entries. It has been shown that large arrays dissipate the majority of power in processor designs and therefore limiting array accesses is a key to reducing overall power.

By dividing the logical trace cache into multiple physical arrays, this invention is able to save the power of entire physical array accesses by enabling only the arrays that contain the instructions we are interested in. For example, the suggested logical trace line is 24 instructions wide but it is constructed using 4 physical arrays of 6 instructions each. If a trace is accessed and found to only be 6 instructions wide, then only the first physical array is accessed and power is saved by not accessing the others.

FIG. 2 also shows a series of instruction buffers (T$Output) after the trace cache. These buffers capture instructions as they are read from the cache. The trace size stored in the directory is also used to enable the clocks of these buffers thereby reducing power when traces are shorter than 24 instructions. This information is further passed downstream as "valid bits" to enable/disable buffers throughout the pipeline.

Figure 4:
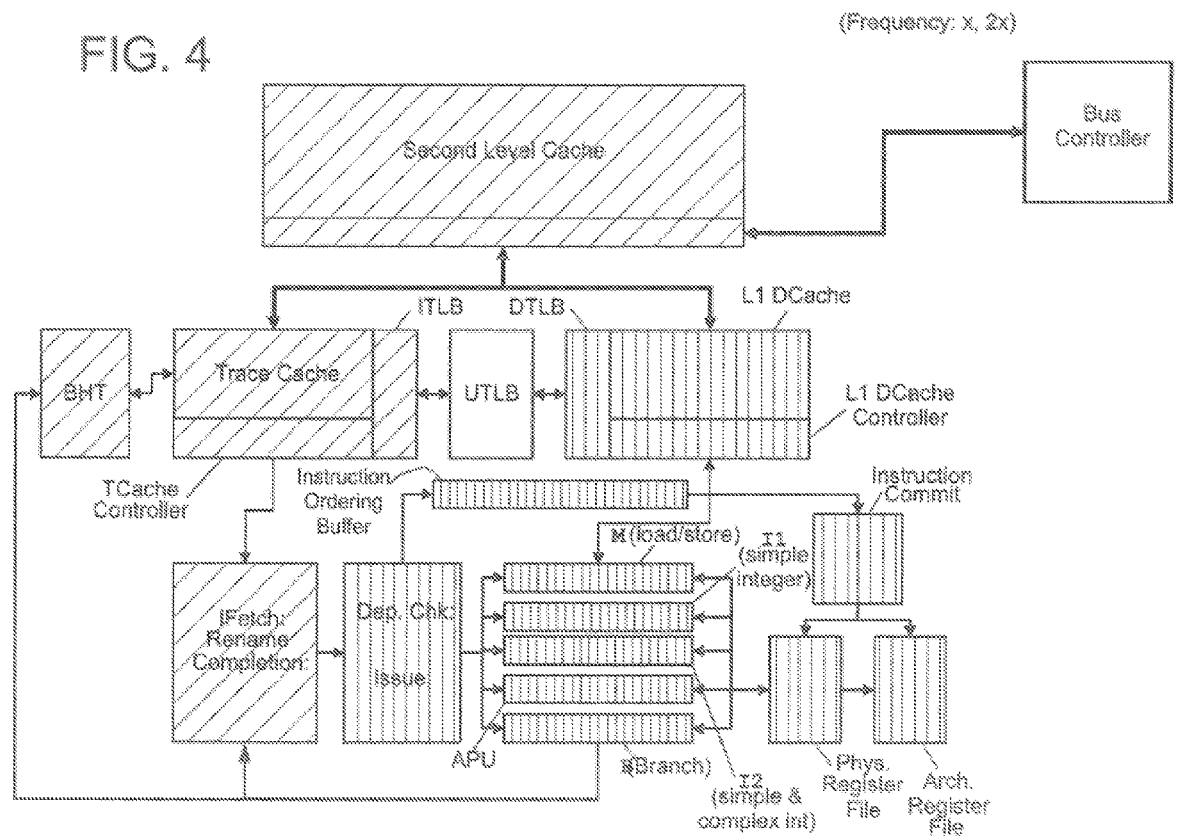
FIG. 4 is a block diagram of certain hardware elements of an apparatus embodying this invention.

FIG. 4 shows an overview of the processor design. The diagram has been shaded to identify to different frequency domains. The trace cache logic (represented in right angled slash) executes at half the clock speed of the rest of the core logic (represented in vertical slash). Note that the second level cache also runs at half clock speed which is typical of many other processor designs. Running logic at half clock speed is a power advantage (AC power is half) but can also hurt performance. Second level caches take advantage of the half clock speed while maintaining good performance by providing a large amount of data per cycle (large bandwidth).

This trace cache provides the same advantage as the second level cache by providing a large number of instructions per cycle. As shown in FIG. 2, the trace cache provides up to 24 instructions per cycle but downstream decode and issue stages deal with only 6 instructions per cycle. While the downstream stages are working on older instructions, the trace cache is accessing the next set of instructions.

This design also improves on power by moving the branch prediction logic out of the cache access path. As shown in FIG. 4, branch prediction is represented by the "BHT" (branch history table) box and occurs as traces are formed and before placement in the trace cache. Typical designs access the instruction cache and then execute the branch prediction logic on all instructions as they move from the cache to the execution stages. This design moves the branch prediction logic before the cache and incorporates the prediction information into the traces. Branch predict power is only consumed during trace formation and not during normal operation when trace cache hits are occurring.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
a computer system central processor;
layered memory operatively coupled to said central processor and accessible thereby, said layered memory having a level one cache storing in interchangeable locations both standard cache lines and trace lines; and
a trace cache controller having a directory guiding access to lines stored in said level one cache, the directory having both tag data and size data for stored cache lines, the controller optimizing power requirements in accessing stored cache lines by reading data associated with valid instruction entries;
said trace cache controller operating level one cache processes at a clock speed which is a fraction of the clock speed of said central processor.

2. Apparatus according to claim 1 wherein said level one cache stores instruction data in blocks of predetermined size, the predetermined size being a fraction of the storage capability of a single cache line.

3. Apparatus according to claim 1 wherein the logical structure of said level one cache is divided into a plurality of physical arrays, and further wherein said controller accesses a number of physical arrays limited to those necessary to retrieve relevant instruction data.

4. Apparatus according to claim 1 further comprising a branch history table function predicting branching within instructions to be stored as traces prior to storage of such traces.

5. Method comprising:
coupling together a computer system central processor and layered memory accessible by the central processor;
selectively storing in interchangeable locations of a level one cache of the layered memory both standard cache lines and trace lines;
operating trace cache processes at a clock speed which is a fraction of the clock speed of the central processor;
storing tag data and size data for each stored cache line; and
optimizing power requirements in accessing stored cache lines by reading data associated with valid instruction entries.

6. Method according to claim 5 wherein the selective storing of cache lines stores instruction data in blocks of predetermined size, the predetermined size being a fraction of the storage capability of a single cache line.

7. Method according to claim 5 wherein the logical structure of the level one cache is divided into a plurality of physical arrays, and further comprising accessing a number of physical arrays limited to those necessary to retrieve relevant instruction data.

8. Method according to claim 5 further comprising predicting branching within instructions to be stored as traces prior to storage of such traces.

9. Programmed method comprising:

coupling together a computer system central processor and layered memory accessible by the central processor, the layered memory including a level one cache;

selectively storing in interchangeable locations of the level one cache of the layered memory both standard cache lines and trace lines;

operating trace cache processes at a clock speed which is a fraction of the clock speed of the central processor;

storing tag data and size data for each stored cache line; and optimizing power requirements in accessing stored cache lines by reading data associated with valid instruction entries.

10. Programmed method according to claim 9 wherein the selective storing of cache lines stores instruction data in blocks of predetermined size, the predetermined size being a fraction of the storage capability of a single cache line.

11. Programmed method according to claim 9 wherein the logical structure of the level one cache is divided into a plurality of physical arrays, and further comprising accessing a number of physical arrays limited to those necessary to retrieve relevant instruction data.

12. Programmed method according to claim 9 further comprising predicting branching within instructions to be stored as traces prior to storage of such traces.

* * * * *